J. H. SAGER.
BUMPER.
APPLICATION FILED NOV. 20, 1916.
1,236,487.
Patented Aug. 14, 1917.
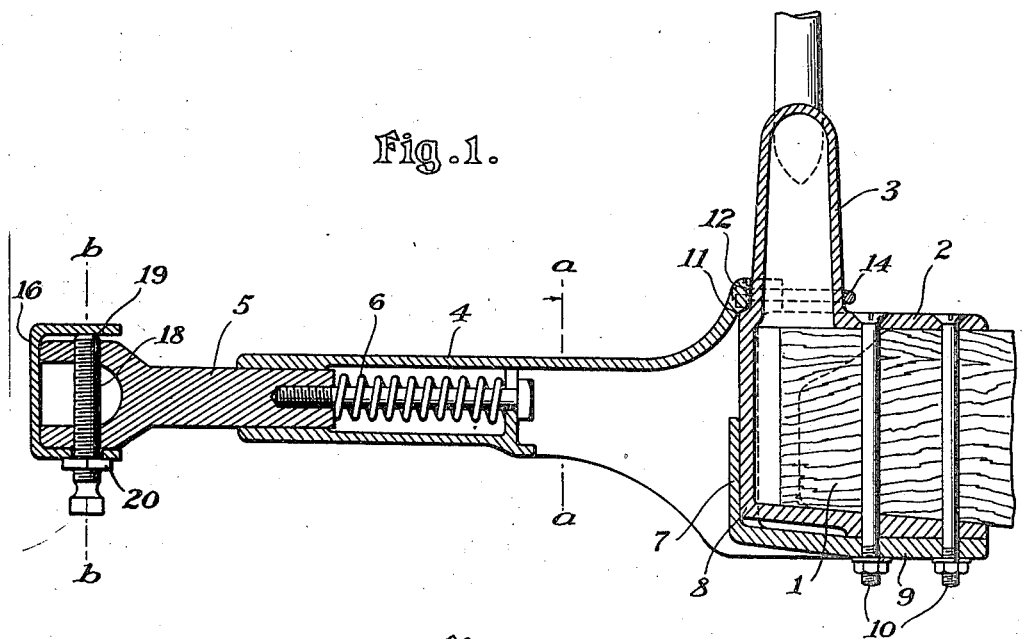
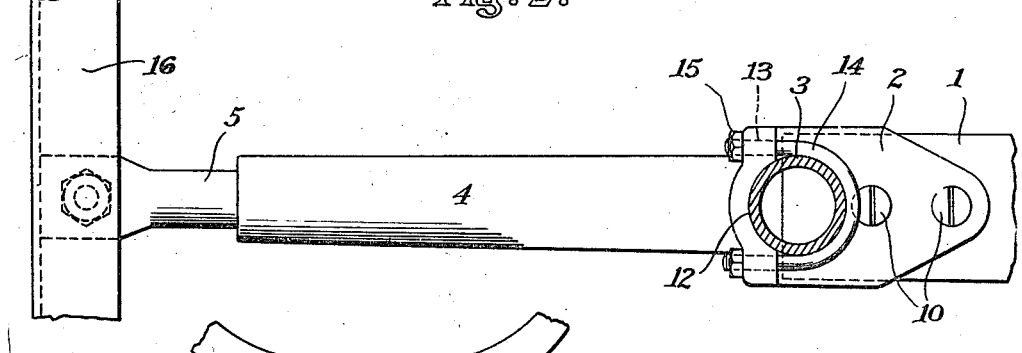
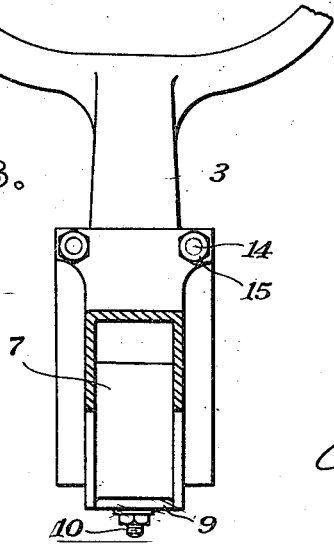
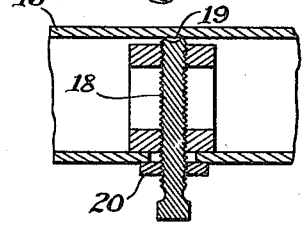
Inventor:
James H. Sager
by Davis & Simms
his attorneys

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION OF NEW YORK.

BUMPER.

1,236,487.  Specification of Letters Patent.  Patented Aug. 14, 1917.

Application filed November 20, 1916. Serial No. 132,298.

*To all whom it may concern:*

Be it known that I, JAMES H. SAGER, a citizen of the United States, and resident of Rochester, in the county of Monroe and State of New York, have invented certain new and useful Improvements in Bumpers, of which the following is a specification.

The present invention relates to bumpers and more particularly to the type used on the fronts of automobiles, an object of this invention being to provide a novel and simple means for attaching the bumper supporting arms to the frame bars of those automobiles, such as the "Franklin," where uprights are provided at the front ends of the frame bars for the purpose of supporting the headlights.

To these and other ends, the invention consists of certain parts and combinations of parts all of which will be hereinafter described, the novel features being pointed out in the appended claims.

In the drawings:—

Figure 1 is a vertical section through the forward end of the vehicle frame bar and one of the supporting arms of the buffer;

Fig. 2 is a plan view of one of the supporting arms attached to the supporting end of the vehicle frame bar;

Fig. 3 is a section on the line $a$—$a$, Fig. 1; and

Fig. 4 is a section on the line $b$—$b$, Fig. 1.

Prior to this invention, attempts have been made to effectively secure a bumper to the frame bars of a "Franklin" automobile but, in such previous construction, the attachment of the supporting arms of the bumper has been complicated and expensive when a durable structure has been secured, the difficulties being that the uprights which support the lamps have been considered to interfere with the proper attachment of the bumper supporting arms. These difficulties are overcome in this invention by utilizing these lamp supporting uprights in the attachment of the bumper supporting arms.

Referring more particularly to the drawings, 1 indicates one of the frame bars of the vehicle which is provided with a casing 2 at one end in which the lamp supporting upright 3 projects upwardly. The bumper supporting arms which, in this instance, each comprise a rear member 4 and a forward member 5 telescoping therewith, with a helical spring 6 interposed between them, have each a portion 7 abutting the forward end 8 of a frame bar. From the abutting portion 7 a portion 9 extends rearwardly to engage the under surface of the frame bar, this rearwardly-extending portion 9 being secured by bolts 10 which also serve to secure the end casing 2 of the frame bar. Above the abutting portion 7 the rear member 4 has an upwardly projecting portion 11 formed with a seat 12 which conforms to a part of the circumference of the upright 3. On opposite sides of this seat 12 the portion 11 is formed with two parallel openings 13 through which the arms of a U-bolt 14 pass, the U-bolt 14 surrounding said upright 3 and being held to the portion 11 by nuts 15 secured on the threaded ends of the U-bolt, thus providing a fastening means which passes about the upright 3 and utilizes the latter for securing the bumper arms.

The bumper bar is provided adjacent each supporting arm in the lower wall of the channel with a slot 17 and through this slot a screw 18 passes loosely. This screw 18 is threaded through the forward member 5 of the bumper supporting arm and has an upper cupped end 19 abutting the inner face of the upper wall of the channel bar 16. By this arrangement the inner face of the lower wall of the channel bar 16 is forced into firm contact with the under side of the end of the outer member 5, while the upper cupped end 19 of the screw firmly engages the inner face of the upper wall of the channeled bar 16. A lock nut 20 arranged on the screw or bolt 18 engages the outer face of the lower wall of the channel bar and holds the screw against movement in the slot 17. By this arrangement the bumper supporting arms are firmly engaged with the channeled bumper bar. It is understood, of course, that the cross sectional form of the channel bar 16 may be different from that herein shown.

What I claim as my invention and desire to secure by Letters Patent is:—

1. In combination with a frame bar having an upright at its forward end, a bumper arm abutting the forward end of said bar and having a portion extending above said abutting portion, and provided with a segmental seat opening rearwardly and a clamping member carried by and movably mounted on the portion of the bumper arm extending above said abutting portion, said clamping member passing about the upright and being movable to draw the segmental seat against the upright.

2. In combination with a frame bar having an upright at its forward end, a bumper arm abutting the end of said bar and having a portion extending under the bar and a portion extending above the bar and provided with a segmental seat, fastening means for securing the portion under the bar to the latter, and a clamping member movably mounted on the portion of the bumper arm above the frame bar and extending about the upright in rear of the portion which abuts the end of the frame bar to draw said segmental seat against the upright.

3. In combination with a frame bar having an upright at its forward end, a bumper arm abutting the forward end of the frame bar and having a portion extending above the bar and said abutting portion, and a horizontally arranged U-bolt carried by the portion of the bumper arm that extends above said abutting portion, said bolt passing about the upright.

4. In combination with a frame bar having an upright at its forward end, a bumper arm abutting the forward end and having a portion extending under the bar and having also a portion extending upwardly above the bar and formed with a seat for engaging the front face of the upright, a U-bolt carried by the upwardly extending portion of the bumper arm and extending about the upright, and a bolt passing through the bar and through the portion of the bumper arm under the bar.

5. In combination with a frame bar having an upright at its forward end, a bumper arm abutting the forward end and having a portion extending under the bar and a portion extending upwardly above the bar, a bolt passing through the bar and the portion under the bar, and a clip carried by the portion of the bumper arm above the bar and adapted to engage the upright to draw the bumper arm firmly against the end of the bar.

JAMES H. SAGER.

Copies of this patent may be obtained for five cents each, by addressing the "Commissioner of Patents, Washington, D. C."